US012585369B2

(12) United States Patent
Kim et al.

(10) Patent No.: US 12,585,369 B2
(45) Date of Patent: Mar. 24, 2026

(54) ELECTRONIC DEVICE INCLUDING MULTI-CHANNEL GRIP SENSOR, AND METHOD FOR SENSING CAPACITANCE CHANGE USING MULTI-CHANNEL GRIP SENSOR

(71) Applicant: SAMSUNG ELECTRONICS CO., LTD., Suwon-si (KR)

(72) Inventors: Sanguk Kim, Suwon-si (KR); Shinyoung Kang, Suwon-si (KR); Joosung Kim, Suwon-si (KR); Hyoseok Na, Suwon-si (KR); Sungjae Moon, Suwon-si (KR); Wanjae Ju, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/986,162

(22) Filed: Dec. 18, 2024

(65) Prior Publication Data

US 2025/0258574 A1 Aug. 14, 2025

Related U.S. Application Data

(63) Continuation of application No. PCT/KR2023/004691, filed on Apr. 7, 2023.

(30) Foreign Application Priority Data

Jun. 22, 2022 (KR) ........................ 10-2022-0076339
Jul. 18, 2022 (KR) ........................ 10-2022-0088562

(51) Int. Cl.
*G06F 3/044* (2006.01)
*G06F 1/16* (2006.01)
(Continued)

(52) U.S. Cl.
CPC .......... *G06F 3/0448* (2019.05); *G06F 1/1698* (2013.01); *G06F 3/04164* (2019.05);
(Continued)

(58) Field of Classification Search
CPC .. G09F 3/0448; G09F 3/04164; G09F 1/1698; H04M 1/0202; H04M 2250/22; G06F 2203/04104
(Continued)

(56) References Cited

U.S. PATENT DOCUMENTS 9,864,087 B2 1/2018 Komulainen et al.
10,122,081 B2 11/2018 Black et al.
(Continued)

FOREIGN PATENT DOCUMENTS

EP 3 978 939 A1 4/2022
KR 10-2015-0001072 A 1/2015
(Continued)

OTHER PUBLICATIONS

International Search Report (PCT/ISA/210) issued by the International Searching Authority on Jul. 11, 2023 in International Application No. PCT/KR2023/004691.
(Continued)

*Primary Examiner* — Mark Edwards
(74) *Attorney, Agent, or Firm* — Sughrue Mion, PLLC

(57) ABSTRACT

An electronic device includes: a first antenna; a second antenna; a first radio frequency (RF) front-end circuit configured to transmit a first RF signal to the first antenna via a first RF signal path; a second RF front-end circuit configured to transmit a second RF signal to the second antenna via a second RF signal path; and a multi-channel grip sensor including a first channel and a second channel, wherein the first channel is connected to the first antenna via a first grip sensing path, wherein the second channel is connected to the
(Continued)

second antenna via a second grip sensing path, and wherein the multi-channel grip sensor is configured to sense a change in a first capacitance of the first antenna through the first channel and a change in a second capacitance of the second antenna through the second channel.

17 Claims, 6 Drawing Sheets

(51) Int. Cl.
   *G06F 3/041*      (2006.01)
   *H04M 1/02*      (2006.01)

(52) U.S. Cl.
   CPC . *H04M 1/0202* (2013.01); *G06F 2203/04104* (2013.01); *H04M 2250/22* (2013.01)

(58) Field of Classification Search
   USPC .......................................................... 345/174
   See application file for complete search history.

(56) References Cited

U.S. PATENT DOCUMENTS

| | | | |
|---|---|---|---|
| 11,191,035 B2 | 11/2021 | Liu et al. | |
| 2015/0003551 A1 | 1/2015 | Kim | |
| 2015/0234077 A1* | 8/2015 | Komulainen | ............ G01V 3/12 |
| | | | 324/629 |
| 2015/0303979 A1 | 10/2015 | Shin et al. | |
| 2016/0173185 A1* | 6/2016 | Kang | ................... H04B 7/0834 |
| | | | 375/267 |
| 2017/0047637 A1 | 2/2017 | Kim et al. | |
| 2017/0331175 A1 | 11/2017 | Kwon et al. | |
| 2019/0393918 A1 | 12/2019 | Han et al. | |
| 2020/0194928 A1 | 6/2020 | Yeo et al. | |
| 2021/0185164 A1* | 6/2021 | Jung | ........................ H01Q 1/42 |
| 2021/0250873 A1* | 8/2021 | Liu | ........................ H04W 52/18 |
| 2023/0188173 A1 | 6/2023 | Yun et al. | |

FOREIGN PATENT DOCUMENTS

| | | | |
|---|---|---|---|
| KR | 10-2015-0121832 A | 10/2015 | |
| KR | 10-2017-0019838 A | 2/2017 | |
| KR | 10-2017-0128015 A | 11/2017 | |
| KR | 10-2020-0073478 A | 6/2020 | |
| KR | 10-2126995 B1 | 6/2020 | |
| WO | 2022/030977 A1 | 2/2022 | |

OTHER PUBLICATIONS

Written Opinion (PCT/ISA/237) issued by the International Searching Authority on Jul. 11, 2023 in International Application No. PCT/KR2023/004691.

Communication dated Jul. 23, 2025, issued by European Patent Office in European Patent Application No. 23827338.7.

* cited by examiner

ELECTRONIC DEVICE INCLUDING MULTI-CHANNEL GRIP SENSOR, AND METHOD FOR SENSING CAPACITANCE CHANGE USING MULTI-CHANNEL GRIP SENSOR

CROSS-REFERENCE TO RELATED APPLICATIONS

This application is a continuation application of International Application No. PCT/KR2023/004691 designating the United States, filed on Apr. 7, 2023, in the Korean Intellectual Property Receiving Office and claiming priority to Korean Patent Application No. 10-2022-0076339, filed on Jun. 22, 2022, and Korean Patent Application No. 10-2022-0088562, filed on Jul. 18, 2022, in the Korean Intellectual Property Office, the disclosures of which are incorporated by reference herein in their entireties.

BACKGROUND

1. Field

The disclosure relates to a method and device for sensing capacitance using a multi-channel grip sensor.

2. Description of Related Art

Capacitance varies according to a distance between two conductors, their area, and a permittivity of a dielectric between the two conductors. In wireless communications, impedance matching of circuits used to transmit and/or receive a radio frequency (RF) signal may be necessary to transmit and/or receive an RF signal while reducing a loss.

SUMMARY

In accordance with an aspect of the disclosure, an electronic device includes: a first antenna; a second antenna; a first radio frequency (RF) front-end circuit configured to transmit a first RF signal to the first antenna via a first RF signal path; a second RF front-end circuit configured to transmit a second RF signal to the second antenna via a second RF signal path; a transceiver connected to the first RF front-end circuit and the second RF front-end circuit; and a multi-channel grip sensor including a first channel and a second channel, wherein the first channel is connected to the first antenna via a first grip sensing path, wherein the second channel is connected to the second antenna via a second grip sensing path, wherein the multi-channel grip sensor is configured to sense a change in a first capacitance of the first antenna through the first channel and a change in a second capacitance of the second antenna through the second channel.

The first RF signal path may include a coaxial cable or a flexible RF cable (FRC).

The electronic device may further include: a communication processor configured to control the transceiver; and a flexible printed circuit board (FPCB) connecting the multi-channel grip sensor to the communication processor.

The electronic device may further include a main board and a sub-board. The first RF front-end circuit, the second RF front-end circuit, and the transceiver may be provided on the main board of the electronic device, and the multi-channel grip sensor may be provided on the sub-board of the electronic device.

The first antenna may be provided adjacent to the sub-board, and the second antenna may be provided adjacent to the main board.

The electronic device may further include: a first isolation circuit connected between the first channel of the multi-channel grip sensor and the first antenna on the first grip sensing path; a second isolation circuit connected between the second channel and the first RF signal path on the second grip sensing path; and a third isolation circuit connected between the first RF signal path and the second antenna on the second grip sensing path.

Each of the first isolation circuit, the second isolation circuit, and the third isolation circuit may include either an inductor of 40 nH or greater or a resistor of 500 ohms or less.

The electronic device may further include: a first matching circuit on the first RF signal path; and a second matching circuit on the second RF signal path. The first matching circuit and the second matching circuit may be configured to perform impedance matching.

The electronic device may further include: a third antenna; and a third RF front-end circuit configured to transmit a third RF signal to the third antenna via a third RF signal path.

The third RF signal path may include a coaxial cable or an FRC.

In accordance with an aspect of the disclosure, an electronic device includes: a first antenna; a second antenna; a third antenna; a RF front-end circuit configured to transmit a first RF signal to the first antenna via a first RF signal path; a second RF front-end circuit configured to transmit a second RF signal to the second antenna via a second RF signal path; a third RF front-end circuit configured to transmit a third RF signal to the third antenna via a third RF signal path; a transceiver connected to the first RF front-end circuit, the second RF front-end circuit, and the third RF front-end circuit; and a multi-channel grip sensor including a first channel and a second channel, wherein the first channel is connected to the first antenna via a first grip sensing path, wherein the second channel is connected to the second antenna via a second grip sensing path, wherein the second channel is connected to the third antenna via the second channel, wherein the multi-channel grip sensor is configured to sense a change in a first capacitance of the first antenna through the first channel, a change in a second capacitance of the second antenna through the second channel and a chance in a third capacitance of the third antenna through the second channel.

The electronic device may further include a main board and a sub-board. The first RF front-end circuit, the second RF front-end circuit, the third RF front-end circuit, and the transceiver may be provided on the main board of the electronic device. The multi-channel grip sensor may be provided on the sub-board of the electronic device. The first antenna and the third antenna may be provided adjacent to the sub-board, and the second antenna may be provided adjacent to the main board.

The electronic device may further include: a first isolation circuit connected between the first channel of the multi-channel grip sensor and the first antenna on the first grip sensing path; a second isolation circuit connected between the second channel and the third RF signal path on the second grip sensing path; and a third isolation circuit connected between the third RF signal path and the second antenna on the second grip sensing path.

In accordance with an aspect of the disclosure, a method of sensing capacitance using a multi-channel grip sensor in an electronic device configured to perform wireless communication, includes: sensing, using a first channel of the multi-channel grip sensor connected to a first antenna of the electronic device, a change in a first capacitance of the first antenna; and sensing, using a second channel of the multi-channel grip sensor connected to a second antenna through a first RF signal path, a change in a second capacitance of the second antenna. An RF signal is transmitted through the first RF signal path between the first antenna and a first RF front-end circuit of the electronic device.

The method may further include: performing impedance matching of the first antenna based on the change in the first capacitance of the first antenna; and performing impedance matching of the second antenna based on the change in the second capacitance of the second antenna.

In accordance with an aspect of the disclosure, an electronic device includes: a first board; a second board connected to the first board via a flexible printed circuit board and a radio frequency cable; a processor provided on the first board; a first antenna; a second antenna; a first RF front-end circuit provided on the first board, and configured to transmit a first RF signal to the first antenna via a first RF signal path, wherein the first RF signal path includes the radio frequency cable; a second RF front-end circuit provided on the first board, and configured to transmit a second RF signal to the second antenna via a second RF signal path; and a multi-channel grip sensor provided on the second board, connected to the processor via the flexible printed circuit board, and including a first channel and a second channel, wherein the first channel is connected to the first antenna via a first grip sensing path, wherein the second channel is connected to the second antenna via a second grip sensing path, wherein the multi-channel grip sensor is configured to sense a change in a first capacitance of the first antenna through the first channel and a change in a second capacitance of the second antenna through the second channel.

The electronic device may further include a plurality of matching circuits, and the processor may be configured to, based on a change in capacitance of the first antenna or the second antenna, control the plurality of matching circuits to performance impedance matching.

The electronic device may further include a first matching circuit provided on the second board, and the processor may be configured to, based on a change in capacitance of the first antenna, control the first matching circuit to performance impedance matching.

The electronic device may further include a second matching circuit provided on the first board, and the processor may be configured to, based on a change in capacitance of the second antenna, control the second matching circuit to performance impedance matching.

The first RF front-end circuit may include a first duplexer and a first amplifier, and the second RF front-end circuit may include a second duplexer and a second amplifier.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
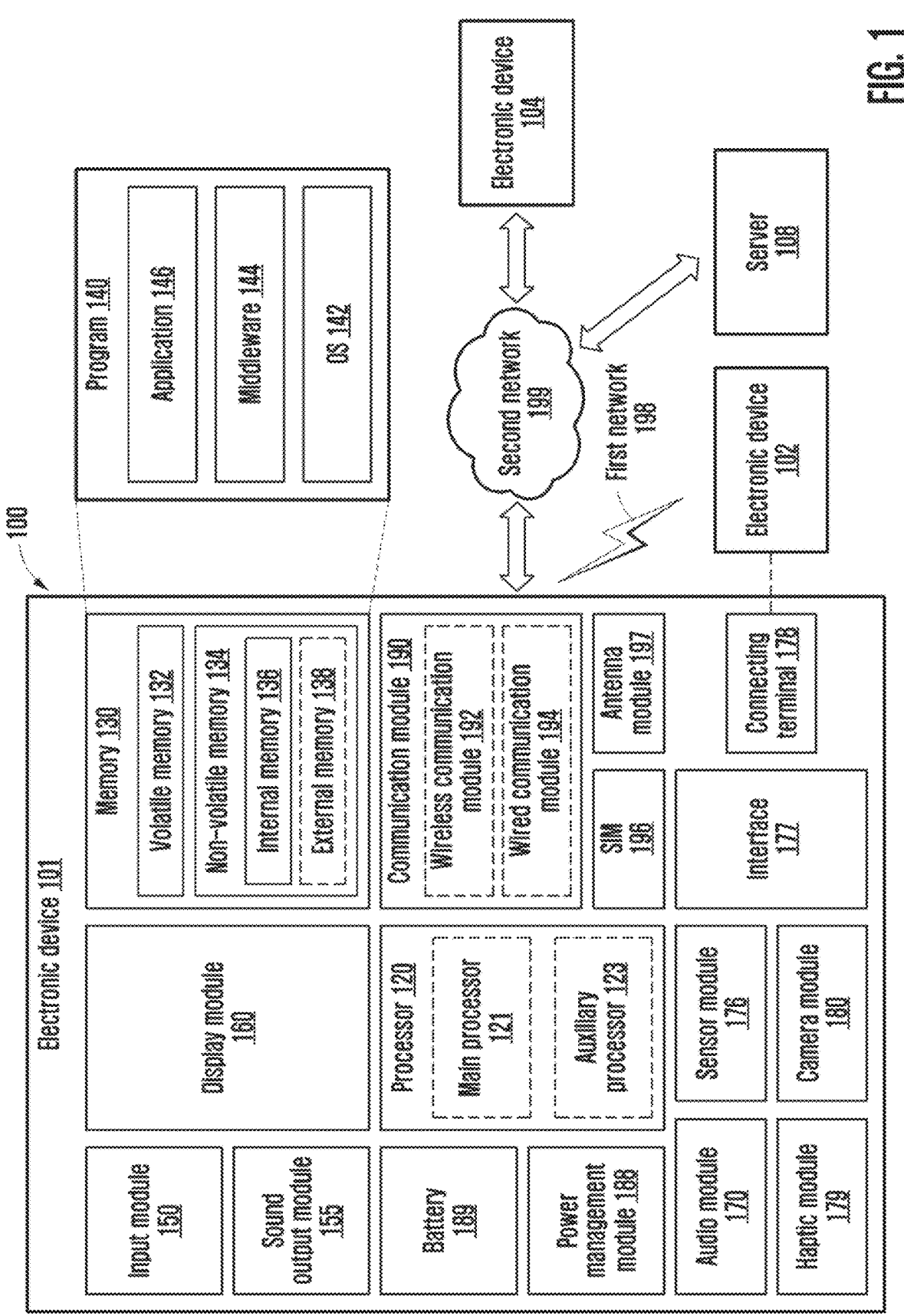
FIG. 1 is a block diagram illustrating an electronic device in a network environment, according to one or more embodiments.

Hereinafter, embodiments are described in detail with reference to the accompanying drawings. Like reference numerals refer to like components and a repeated description related thereto is omitted.

In a portable electronic device including an antenna for wireless communication, when a user holds the portable electronic device, impedance of the antenna may change due to a hand of the user, and the changed impedance may affect communication performance. A grip sensor may be connected to the antenna and may detect a change in a capacitance of the antenna. When a change in the capacitance is detected, the portable electronic device may perform impedance matching, which may be used to improve communication performance. Portable electronic devices are increasingly required to be slimmer and smaller in size for easier portability by users. However, due to such slimming and miniaturization, difficulties are increasing in arranging or designing antennas and grip sensors within portable electronic devices.

An electronic device including a multi-channel grip sensor according to an embodiment and a method of sensing a change in capacitance using the multi-channel grip sensor may improve performance degradation of the multi-channel grip sensor in a limited mounting space of a portable electronic device. Hereinafter, the electronic device and the method of sensing a change in capacitance are described in detail.

FIG. 1 is a block diagram illustrating an electronic device 101 in a network environment 100, according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added to the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware component) of the electronic device 101 connected to the processor 120 and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specialized for artificial intelligence model processing. An artificial intelligence model may be generated through machine learning. Such learning may be performed, for example, by the electronic device 101 in which the artificial intelligence model is executed, or via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a record. The receiver may be used to receive an incoming call. According to an embodiment, the receiver may be implemented separately from, or as part of, the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to sense a touch, or a pressure sensor adapted to measure the intensity of force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and may generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphones connector).

The haptic module 179 may convert an electrical signal into a mechanical stimulus (e.g., a vibration or a movement) or an electrical stimulus which may be recognized by a user via their tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, for example, new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to one or more embodiments, another component (e.g., a radio frequency integrated circuit (RFIC)) other than the radiating element may be additionally formed as a part of the antenna module 197.

According to embodiments, the antenna module 197 may form a mmWave antenna module. According to an example embodiment, the mmWave antenna module may include a PCB, an RFIC provided on a first surface (e.g., a bottom surface) of the PCB or adjacent to the first surface and capable of supporting a designated high-frequency band (e.g., the mmWave band), and a plurality of antennas (e.g., array antennas) provided on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed by one or more external electronic devices (e.g., the external electronic devices 102 or 104, or the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and may transfer an outcome of the performing to the electronic device 101. The electronic device 101 may provide the outcome, with or without further processing of the outcome, as at least part of a reply to the request. To this end, cloud computing, distributed computing, mobile edge computing (MEC), or client-server computing technology may be used, for example. The electronic device 101 may provide ultra-low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
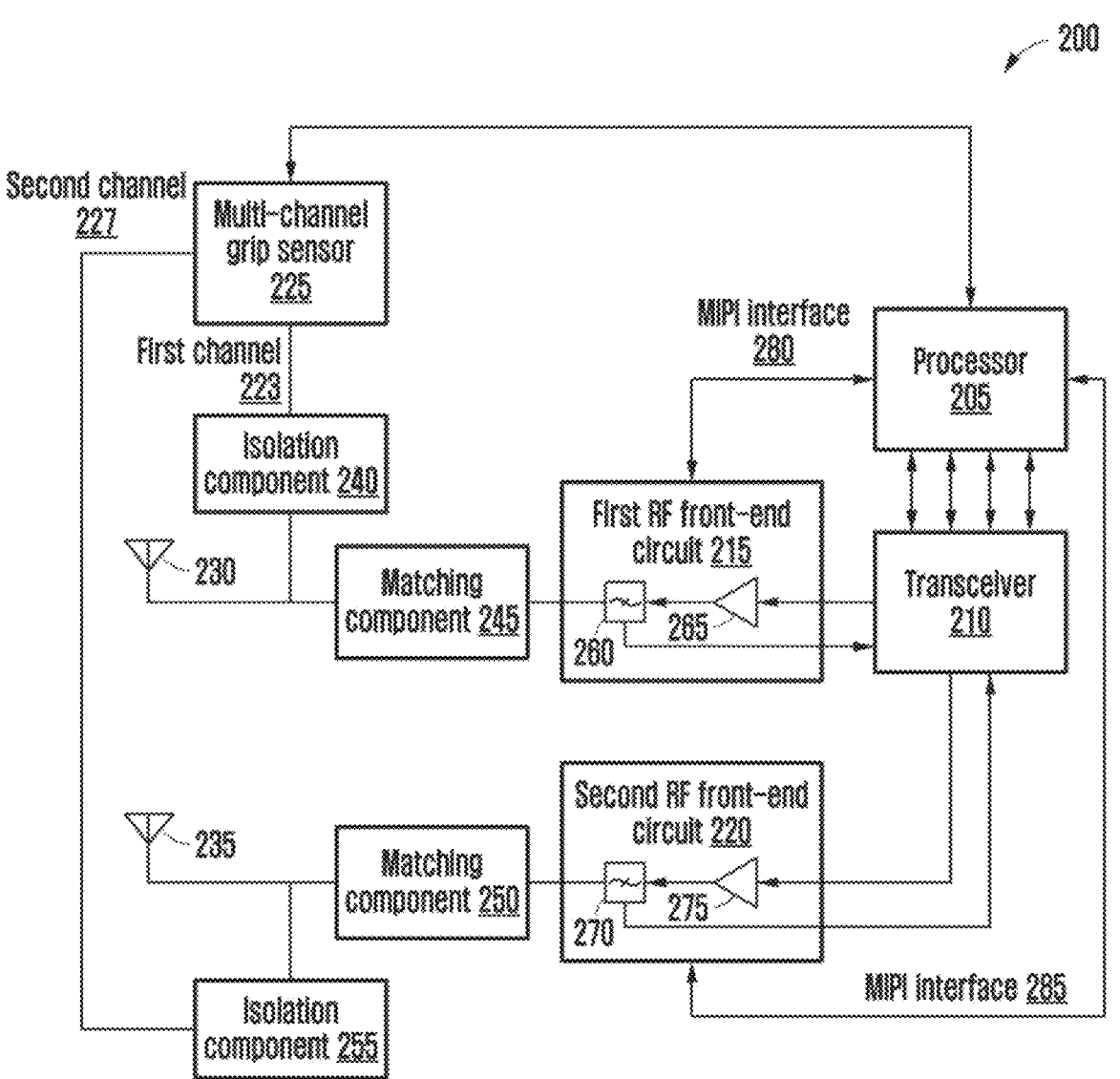
FIG. 2 is a diagram illustrating a configuration of an electronic device including a multi-channel grip sensor, according to an embodiment.

FIG. 2 is a diagram illustrating a configuration of an electronic device including a multi-channel grip sensor, according to an embodiment.

Referring to FIG. 2, an electronic device 200 may include a processor 205, a transceiver 210 controlled by the processor 205 and configured to perform wireless communication, a radio frequency (RF) front-end circuit (e.g., a first RF front-end circuit 215 and a second RF front-end circuit 220) connected to the transceiver 210 and configured to perform preprocessing of RF transmission/reception signals, and an antenna (e.g., a first antenna 230 and a second antenna 235) connected to the RF front-end circuit and configured to transmit and receive an RF signal. The RF front-end circuit may include a duplexer (e.g., a first duplexer 260 and a second duplexer 270) and an amplifier (e.g., a first amplifier 265 and a second amplifier 275). The processor 205 may be a main processor or a communication processor. The transceiver 210 may be controlled by the processor 205 or the transceiver 210 via a mobile industry processor interface (MIPI) interface (e.g., a first MIPI interface 280 and a second MIPI interface 285). The electronic device 200 may include matching components (i.e., matching circuits) 245 and 250 used for impedance matching for RF transmission and reception and isolation components (i.e., isolation circuits) 240 and 255 for reducing an influence of capacitance change sensing of a multi-channel grip sensor 225 on an RF signal.

The electronic device 200 may further include a grip sensor to detect a change in a capacitance of the antenna due to a grip (i.e., a hand) of the user on the electronic device 200. The electronic device 200 may include a plurality of antennas to improve communication performance, and in order to detect a change in capacitance of each of the antennas, the electronic device 200 may include the multi-channel grip sensor 225 that detects a change in capacitance through a plurality of channels (e.g., a first channel 223 and a second channel 227). The multi-channel grip sensor 225 may be controlled by the processor 205. Each channel of the multi-channel grip sensor 225 may be connected to each antenna, and the multi-channel grip sensor 225 may detect a change in the capacitance of the antenna connected to each channel.

In the electronic device 200, each of the channels of the multi-channel grip sensor 225 may be connected to each of the antennas of the electronic device 200. When the electronic device 200 includes a plurality of antennas, the antennas may be provided at positions spaced apart from each other. For example, a portion of the plurality of antennas may be provided close to a main board of the electronic device 200, and another portion may be provided close to a sub-board of the electronic device 200. In order to connect the channels of the multi-channel grip sensor 225 to different antennas, the electronic device 200 may need to further include a circuit for connecting some of the channels of the multi-channel grip sensor 225 between the main board and the sub-board. When the electronic device 200 includes an additional circuit to connect the multi-channel grip sensor 225, it may be difficult to efficiently utilize a space in the electronic device 200. In addition, depending on a placement of the multi-channel grip sensor 225, when the multi-channel grip sensor 225 is close to a heat source such as the processor 205, a performance of the multi-channel grip sensor 225 may be degraded by heat.

Figure 3:
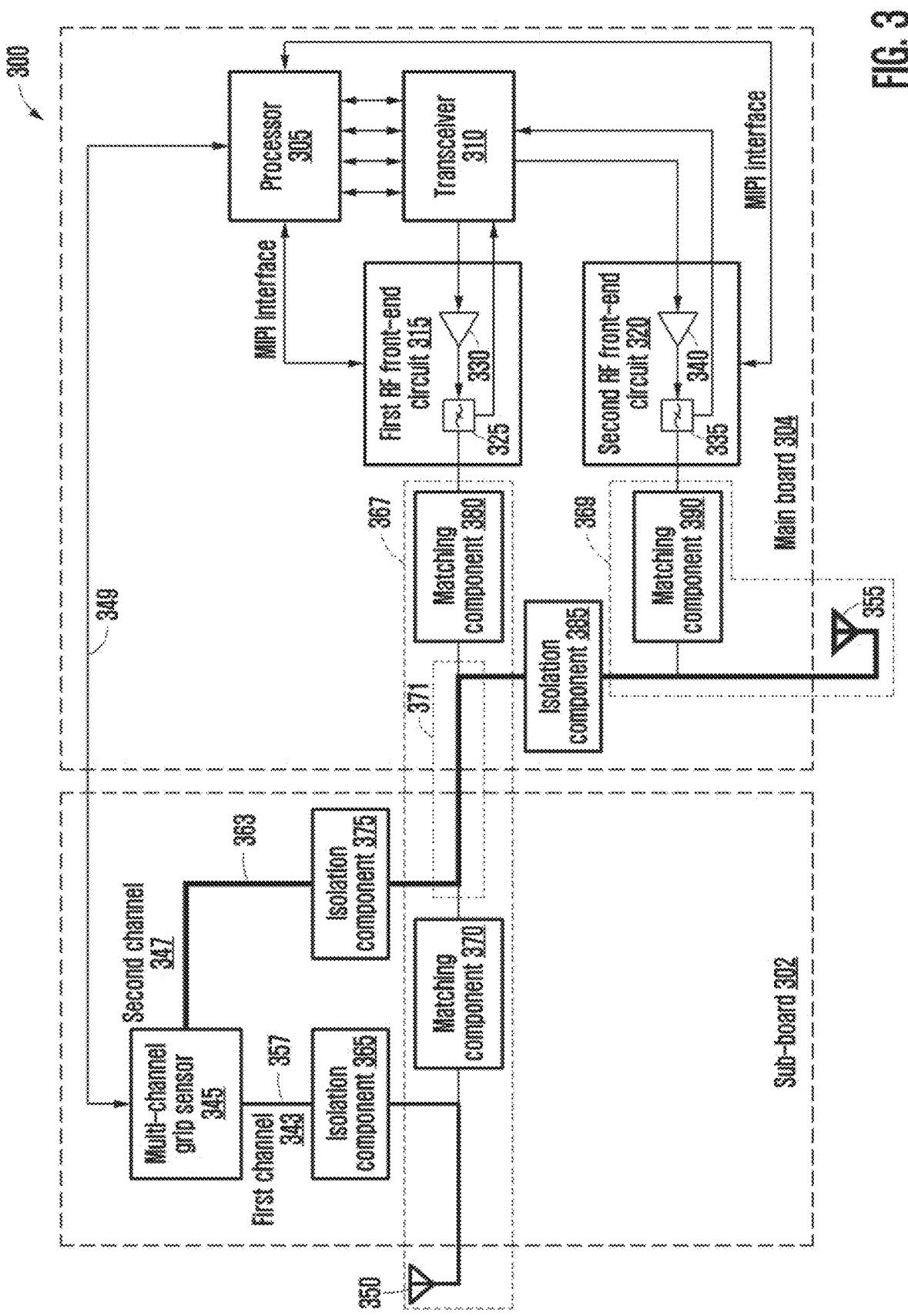
FIG. 3 is a diagram illustrating a configuration of an electronic device including a multi-channel grip sensor, according to an embodiment.

FIG. 3 is a diagram illustrating a configuration of an electronic device including a multi-channel grip sensor, according to an embodiment.

Referring to FIG. 3, an electronic device 300 (e.g., the electronic device 101 of FIG. 1) may include a processor 305 (e.g., the processor 120 of FIG. 1), a transceiver 310 controlled by the processor 305 and configured to perform wireless communication, RF front-end circuits (e.g., a first RF front-end circuit 315 or a second RF front-end circuit 320) connected to the transceiver 310 and configured to perform preprocessing of RF transmission/reception signals, and/or an antenna (e.g., a first antenna 350 or a second antenna 355) connected to the RF front-end circuit and configured to transmit and receive an RF signal. An RF front-end circuit may include a duplexer (e.g., a first duplexer 325 or a second duplexer 335) and an amplifier (e.g., a first amplifier 330 and a second amplifier 340). The processor 305 may include an application processor (e.g., a main processor 121) or a communication processor (e.g., the auxiliary processor 123). The transceiver 310 may be controlled by, for example, the processor 305 or the transceiver 310 via a MIPI interface. The electronic device 300 may include matching components (i.e., matching circuits) 370, 380, and 390 used for impedance matching for RF transmission and reception and isolation components (i.e., isolation circuits) 365, 375, and 385 for reducing an influence of capacitance change sensing of a multi-channel grip sensor 345 on an RF signal. For example, the electronic device 300 may include a first isolation component (i.e., a first isolation circuit) 365 provided between a first channel 343 of the multi-channel grip sensor 345 and a first antenna 350 on a first grip sensing path 357, a second isolation component (i.e., a second isolation circuit) 375 provided between section 371 of a first RF signal path 367 and a second channel 347 on a second grip sensing path 363, and a third isolation component (i.e., a third isolation circuit) 385 provided between a first RF signal path 367 and a second antenna 355 on the second grip sensing path 363. The isolation components 365, 375, and 385 may include, for example, either an inductor of about 40 nH or greater or a resistor of about 500 ohms or less. The term "signal path" in this specification may be replaced with (i.e., may refer to), for example, "signal line."

In an embodiment, the transceiver 310, the first RF front-end circuit 315, the second RF front-end circuit 320, the matching components 370, 380, and 390, and the isolation components 365, 375, and 385 may be included in the wireless communication module 192 of FIG. 1.

The electronic device 300 may further include a grip sensor to detect a change in a capacitance of the antenna due to a grip (i.e., a hand) of the user on the electronic device 300. The electronic device 300 may include the first antenna 350 or the second antenna 355 to improve communication performance, and in order to detect a change in capacitance of each of the first antenna 350 or the second antenna 355, the electronic device 300 may include the multi-channel grip sensor 345 that detects a change in capacitance through the first channel 343 or the second channel 347. The multi-channel grip sensor 345 may be controlled by the processor 305. Each channel of the multi-channel grip sensor 345 may be connected to each antenna, and the multi-channel grip sensor 345 may detect a change in the capacitance of the antenna connected to each channel.

In an embodiment, the electronic device 300 may include the first RF signal path 367 through which a first RF signal is transmitted between the first RF front-end circuit 315 and the first antenna 350, a second RF signal path 369 through which a second RF signal is transmitted between the second RF front-end circuit 320 and the second antenna 355, the first grip sensing path 357 connecting the first channel 343 of the multi-channel grip sensor 345 to the first antenna 350, and the second grip sensing path 363 connecting the second channel 347 of the multi-channel grip sensor 345 to the second antenna 355.

For example, the electronic device 300 may include a main board 304 and a sub-board 302 on which components of the electronic device 300 are to be mounted. The processor 305, the transceiver 310, the first RF front-end circuit 315, and the second RF front-end circuit 320 may be provided on the main board 304, and the multi-channel grip sensor 345 may be provided on the sub-board 302. By providing the multi-channel grip sensor 345 on the sub-board 302 spaced apart from the processor 305, which may be a heat source, performance degradation of the multi-channel grip sensor 345 due to the heat source may be reduced. Because the multi-channel grip sensor 345 is located on the sub-board 302, a path connecting the sub-board 302 to the main board 304 is needed to connect the second antenna 355 located close to the main board 304 to the second channel 347 of the multi-channel grip sensor 345. When the path connecting the sub-board 302 to the main board 304 is added to connect the second channel 347 to the second antenna 355, an ability to mount within the electronic device 300 may deteriorate. For example, each path connecting the sub-board 302 to the main board 304 occupies physical space within the electronic device 300, and thereby limits space for other components.

In an embodiment, the second grip sensing path 363 may connect the second channel 347 of the multi-channel grip sensor 345 to the second antenna 355 via the first RF signal path 367. In an embodiment, the first RF signal path 367 may include a coaxial cable or a flexible RF cable (FRC) to reduce a signal loss. For example, a coaxial cable or an FRC may be used to transmit an RF signal with a small loss in the section 371 of the first RF signal path 367 that is between the sub-board 302 and the main board 304. In an embodiment, the electronic device 300 may save a mounting space by using the first RF signal path 367, without forming a separate channel, to connect the second channel 347 of the multi-channel grip sensor 345 between the sub-board 302 and the main board 304.

Figure 4:
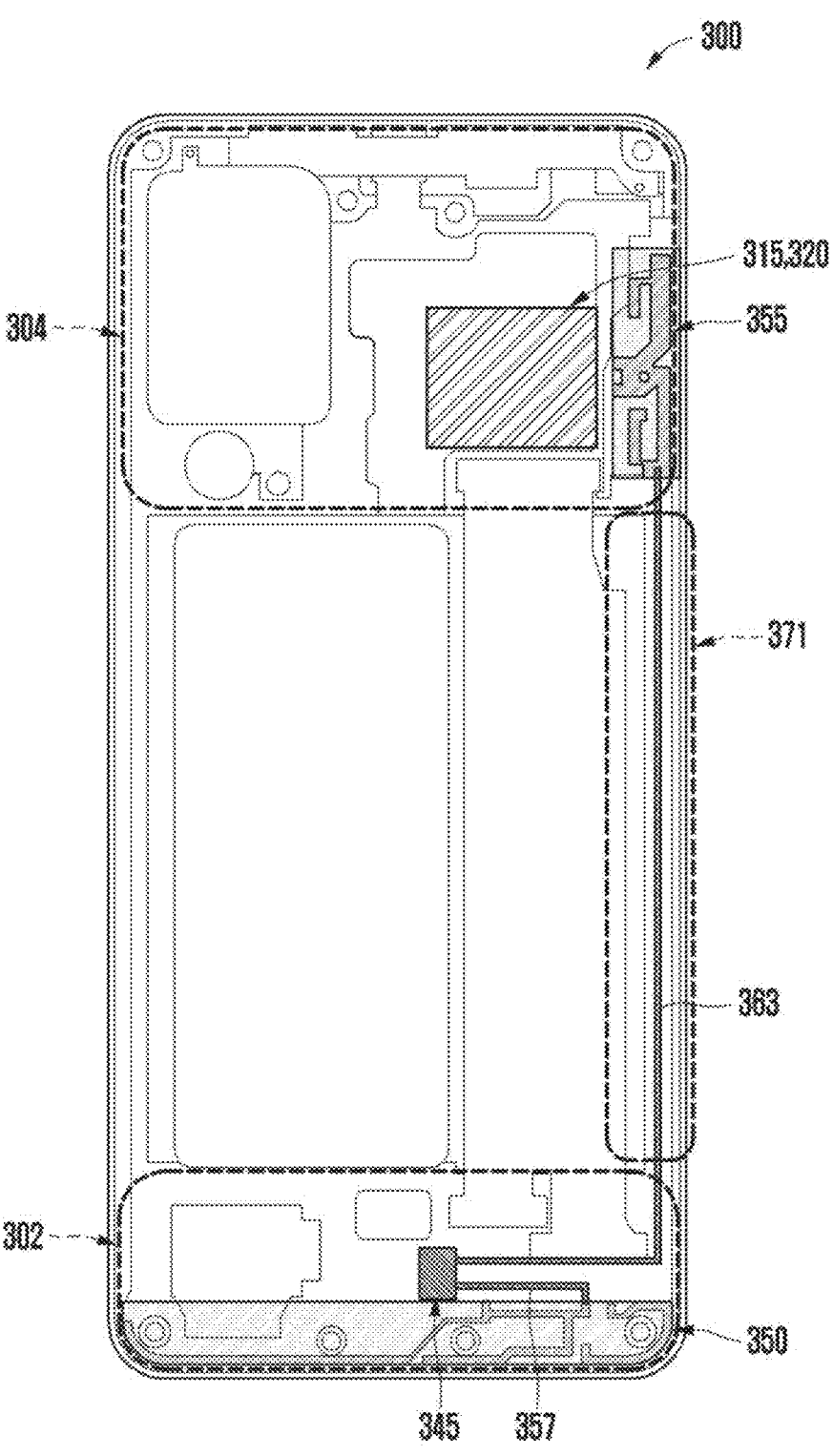
FIG. 4 is a diagram illustrating an exemplary arrangement of a configuration for communication within an electronic device, according to an embodiment.

FIG. 4 is a diagram illustrating an exemplary arrangement of a configuration for communication within an electronic device, according to an embodiment.

Referring to FIG. 4, an example of locations of the main board 304, a sub-board 302, components provided on the main board 304, components provided on the sub-board 302, and antennas (the first antenna 350 and the second antenna 355) in the electronic device 300 is illustrated.

In an embodiment, the multi-channel grip sensor 345 may be provided on the sub-board 302 and spaced apart from a heat source. When the multi-channel grip sensor 345 is provided on the sub-board 302, the first antenna 350 located close to the sub-board 302 may be connected to the first channel 343 of the multi-channel grip sensor 345 using a relatively short wire. In an embodiment, the second antenna 355 located close to the main board 304 may be connected to the second channel 347 of the multi-channel grip sensor 345 via the first RF signal path 367, through which an RF signal is transmitted from the first RF front-end circuit 315 to the first antenna 350.

In an embodiment, the multi-channel grip sensor 345 may be controlled by the processor 305 provided on the main board 304. Control of the multi-channel grip sensor 345 may be performed using a digital signal. Because a digital signal is relatively less affected by heat than an RF signal, which is an analog signal, a coaxial cable and an FRC cable may be omitted. Control of the multi-channel grip sensor 345 may be performed via a separate electrical signal path 349 connecting the main board 304 to the sub-board 302. For example, the electrical signal path 349 connecting the main board 304 to the sub-board 302 may include a flexible printed circuit board (FPCB). For example, the FPCB may occupy less space than a coaxial cable or an FRC.

In an embodiment, the electronic device 300 may further include a third antenna, a third RF front-end circuit connected to the third antenna, and a third RF signal path through which a third RF signal is transmitted between the third RF front-end circuit and the third antenna. The third antenna may be provided at a location adjacent to the sub-board 302. The third RF signal path may include a coaxial cable or an FRC.

Figure 5:
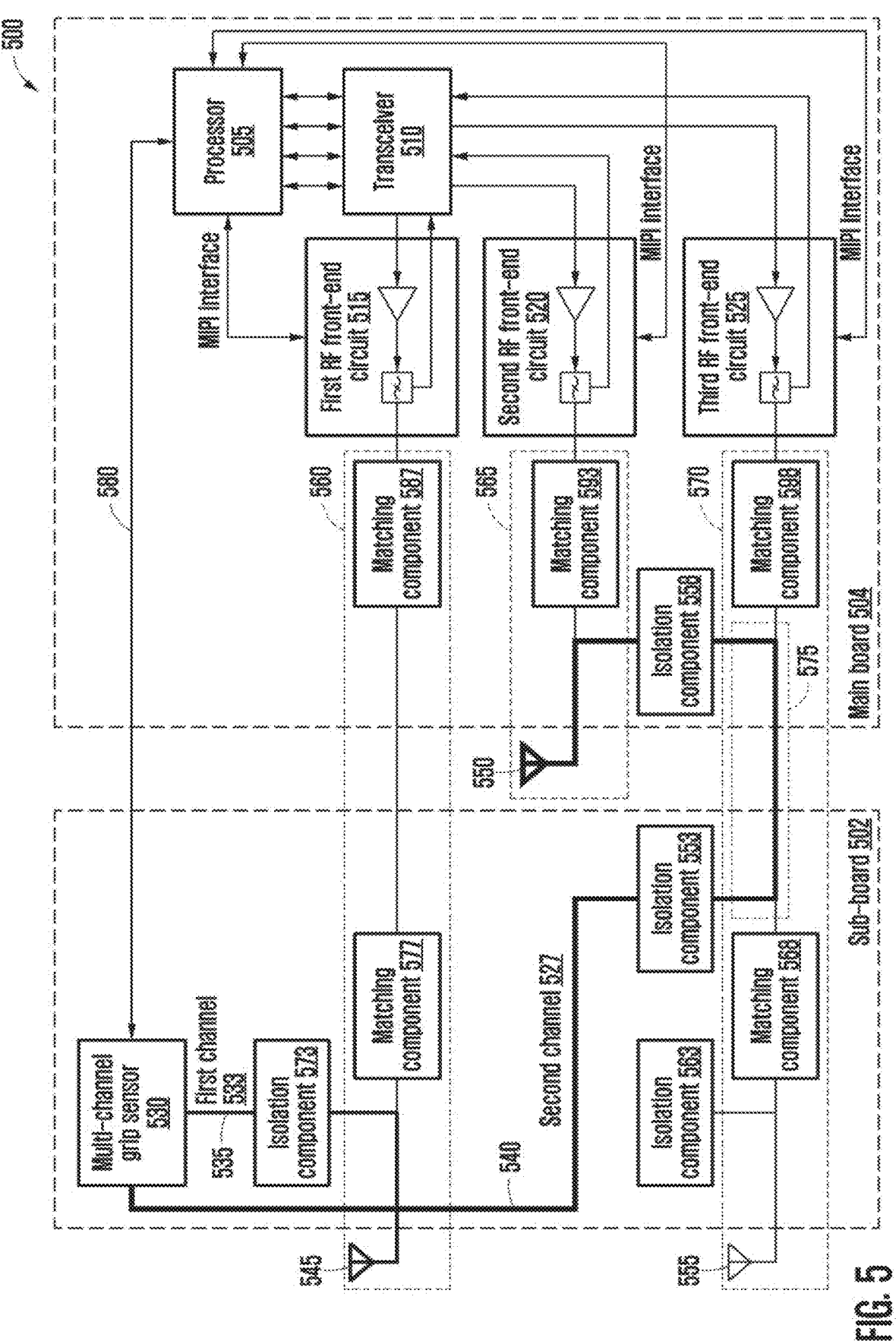
FIG. 5 is a diagram illustrating a configuration of an electronic device including a multi-channel grip sensor, according to an embodiment.

FIG. 5 is a diagram illustrating a configuration of an electronic device including a multi-channel grip sensor, according to an embodiment.

Referring to FIG. 5, an electronic device 500 (e.g., the electronic device 101 of FIG. 1) may include a processor 505 (e.g., the processor 120 of FIG. 1), a transceiver 510 controlled by the processor 505 and configured to perform wireless communication, RF front-end circuits (e.g., a first RF front-end circuit 515, a second RF front-end circuit 520, or a third RF front-end circuit 525) connected to the transceiver 510 and configured to perform preprocessing of RF transmission/reception signals, and an antenna (e.g., a first antenna 545, a second antenna 550, or a third antenna 555) connected to the RF front-end circuit and configured to transmit and/or receive an RF signal. Each of the first RF front-end circuit 515, the second RF front-end circuit 520, or the third RF front-end circuit 525 may include, for example, a duplexer and an amplifier. The processor 505 may be an application processor or a communication processor. The transceiver 510 may be controlled by the processor 505 or the transceiver 510 via a MIPI interface. The electronic device 500 may include matching components (i.e., matching circuits) 577, 587, 593, 568, and 598 used for impedance matching for RF transmission and reception and/or isolation components (i.e., isolation circuits) 573, 563, 553, and 558 for reducing an influence of capacitance change sensing of a multi-channel grip sensor 530 on an RF signal. In an embodiment, the transceiver 510, the first RF front-end circuit 515, the second RF front-end circuit 520, the third RF front-end circuit 525, the matching components 577, 587, 593, 568, and 598, and the isolation components 573, 563, 553, and 558 may be included in the wireless communication module 192 of FIG. 1.

In an embodiment, the electronic device 500 may further include a grip sensor to detect a change in a capacitance of the antenna due to a grip (i.e., a hand) of the user on the electronic device 500. For example, the electronic device 500 may include the first antenna 545, the second antenna 550, or the third antenna 555 to improve communication performance, and in order to detect a change in capacitance of the first antenna 545, the second antenna 550, or the third antenna 555, the electronic device 500 may include the multi-channel grip sensor 530 that detects a change in capacitance through a first channel 533 or a second channel 527. The multi-channel grip sensor 530 may be controlled by the processor 505. Each channel (e.g., the first channel 533 or the second channel 527) of the multi-channel grip sensor 530 may be connected to an antenna (e.g., the first antenna 545, the second antenna 550, or the third antenna 555), and the multi-channel grip sensor 530 may detect a change in the capacitance of the antenna connected to each channel.

In an embodiment, the electronic device 500 may include a first RF signal path 560 through which a first RF signal is transmitted between the first RF front-end circuit 515 and the first antenna 545, a second RF signal path 565 through which a second RF signal is transmitted between the second RF front-end circuit 520 and the second antenna 550, a third RF signal path 570 through which a third RF signal is transmitted between the third RF front-end circuit 525 and the third antenna 555, a first grip sensing path 535 connecting the first channel 533 of the multi-channel grip sensor 530 to the first antenna 545, and a second grip sensing path 540 connecting the second channel 527 of the multi-channel grip sensor 530 to the second antenna 550.

For example, the electronic device 500 may include a main board 504 and a sub-board 502 on which components of the electronic device 500 are provided. For example, the processor 505, the transceiver 510, the first RF front-end circuit 515, the second RF front-end circuit 520, and the third RF front-end circuit 525 may be provided on the main board 504, and the multi-channel grip sensor 530 may be provided on the sub-board 502. By providing the multi-channel grip sensor 530 on the sub-board 502 spaced apart from the processor 505, which may be a heat source, performance degradation of the multi-channel grip sensor 530 due to the heat source may be reduced. Because the multi-channel grip sensor 530 is located on the sub-board 502, a path connecting the sub-board 502 to the main board 504 may be included to connect the second antenna 550 located close to the main board 504 to the second channel 527 of the multi-channel grip sensor 530. When the path connecting the sub-board 502 to the main board 504 is added to connect the second channel 527 to the second antenna 550, an ability to mount within the electronic device 300 may deteriorate.

In an embodiment, the second grip sensing path 540 may connect the second channel 527 of the multi-channel grip sensor 530 to the second antenna 550, while including at least a portion of the third RF signal path 570. In an embodiment, the third RF signal path 570 may include a coaxial cable or an FRC to reduce a signal loss. A coaxial cable or an FRC may be used to transmit an RF signal with a small loss in a section 575 of the third RF signal path 570 that is between the sub-board 502 and the main board 504. The electronic device 500 may save a mounting space by using the third RF signal path 570 without forming a separate channel for connecting the second channel 527 of the multi-channel grip sensor 530 between the sub-board 502 and the main board 504.

In an embodiment, the multi-channel grip sensor 530 may be controlled by the processor 505 provided on the main board 504. Control of the multi-channel grip sensor 530 may be performed using a digital signal. Because a digital signal is relatively less affected by heat than an RF signal, which is an analog signal, a coaxial cable and an FRC cable may be omitted. Control of the multi-channel grip sensor 530 may be performed via a separate electrical signal path 580 connecting the main board 504 to the sub-board 502. For example, the electrical signal path 580 connecting the main board 504 and the sub-board 502 may include an FPCB.

Figure 6:
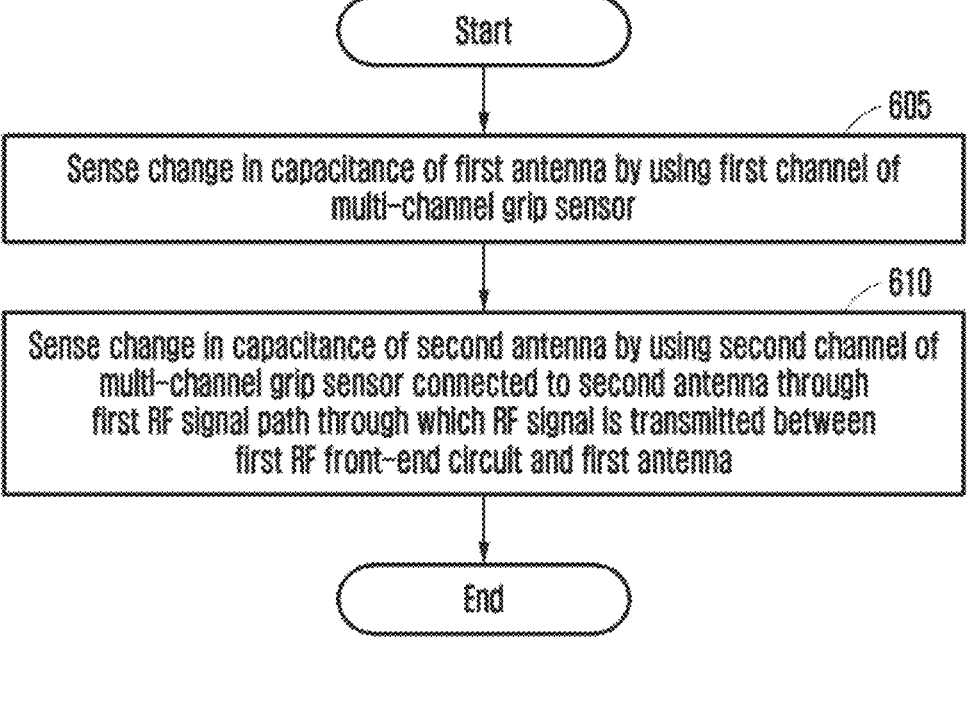
FIG. 6 is a flowchart of a method of sensing a change in capacitance using a multi-channel grip sensor, according to an embodiment.

FIG. 6 is a flowchart of a method of sensing a change in capacitance using a multi-channel grip sensor, according to an embodiment.

Referring to FIG. 6, in operation 605, the electronic device 300 may sense a change in a capacitance of the first antenna 350 by using the first channel 343 of the multi-channel grip sensor 345 connected to the first antenna 350 of the electronic device 300.

The electronic device 300 may perform impedance matching of the first antenna 350 based on the sensed change in the capacitance of the first antenna 350. In an embodiment, the first antenna 350 may be an antenna provided at a location adjacent to the sub-board 302 of the electronic device 300 in the electronic device 300.

In operation 610, the electronic device 300 may sense a change in a capacitance of the second antenna 355 by using the second channel 347 of the multi-channel grip sensor 345 connected to the second antenna 355 through at least the section 371 of the first RF signal path 367 through which an RF signal is transmitted between the first antenna 350 and the first RF front-end circuit 315 of the electronic device 300.

The electronic device 300 may perform impedance matching of the second antenna 355 based on the sensed change in the capacitance of the second antenna 355. In an embodiment, the second antenna 355 may be an antenna provided at a location adjacent to the main board 304 of the electronic device 300 in the electronic device 300. The multi-channel grip sensor 345 may be provided on the sub-board 302.

In an embodiment, the electronic device 500 may sense a change in a capacitance of the first antenna 545 using the first channel 533 of the multi-channel grip sensor 530 connected to the first antenna 545 of the electronic device 500, and may sense a change in a capacitance of the second antenna 550 using the second channel 527 of the multi-channel grip sensor 530 connected to the second antenna 550 through at least a portion of the third RF signal path 570 through which an RF signal is transmitted between the third antenna 555 and the third RF front-end circuit 525 of the electronic device 500.

The electronic device 500 may perform impedance matching of the first antenna 545 based on the sensed change in the capacitance of the first antenna 545, and may perform impedance matching of the second antenna 550 based on the sensed change in the capacitance of the second antenna 550.

The first antenna 545 may be an antenna provided at a location adjacent to the sub-board 502 of the electronic device 500 in the electronic device 500. The second antenna 550 may be an antenna provided at a location adjacent to the main board 504 of the electronic device 500 in the electronic device 500. The third antenna 555 may be an antenna provided at a location adjacent to the sub-board 502 of the electronic device 500 in the electronic device 500. The multi-channel grip sensor 530 may be provided on the sub-board 502.

The electronic device 300 according to an embodiment may include the first antenna 350, the second antenna 355, the first RF front-end circuit 315 connected to the first antenna 350, the second RF front-end circuit 320 connected to the second antenna 355, the transceiver 310 connected to the first RF front-end circuit 315 and the second RF front-end circuit 320 and configured to perform wireless communication, the multi-channel grip sensor 345 including two or more channels for sensing a change in a capacitance of an antenna, wherein, among the channels, the first channel 343 is connected to the first antenna 350 and the second channel 347 is connected to the second antenna 355, the first RF signal path 367 through which a first RF signal is transmitted between the first RF front-end circuit 315 and the first antenna 350, the second RF signal path 369 through which a second RF signal is transmitted between the second RF front-end circuit 320 and the second antenna 355, the first grip sensing path 357 connecting the first channel 343 of the multi-channel grip sensor 345 to the first antenna 350, and the second grip sensing path 363 connecting the second channel 347 of the multi-channel grip sensor 345 to the second antenna 355, while including at least a portion of the first RF signal path 367.

The first RF signal path 367 may include a coaxial cable or an FRC.

The electronic device 300 may further include the processor 305 configured to control the transceiver 310, and an electrical signal path 349 connecting the multi-channel grip sensor 345 to the processor 305, wherein the electrical signal path 349 may include an FPCB.

The first RF front-end circuit 315, the second RF front-end circuit 320, and the transceiver 310 may be provided on the main board 304 of the electronic device 300, and the multi-channel grip sensor 345 may be provided on the sub-board 302 of the electronic device 300.

The first antenna 350 may be provided at a location adjacent to the sub-board 302, and the second antenna 355 may be provided at a location adjacent to the main board 304.

The first isolation component 365 provided between the first channel 343 of the multi-channel grip sensor 345 and the first antenna 350 on the first grip sensing path 357, the second isolation component 375 provided between the second channel 347 and the first RF signal path 367 on the second grip sensing path 363, and the third isolation component 385 provided between the first RF signal path 367 and the second antenna 355 on the second grip sensing path 363 may be further included.

Each of the first isolation component 365, the second isolation component 375, and the third isolation component 385 may include either an inductor of 40 nH or greater or a resistor of 500 ohms or less.

The electronic device 300 may further include matching components provided on the first RF signal path 367 and the second RF signal path 369 and configured to perform impedance matching.

The electronic device 300 may further include the third antenna, the third RF front-end circuit connected to the third antenna, and the third RF signal path through which the third RF signal is transmitted between the third RF front-end circuit and the third antenna.

The third RF signal path may be formed using a coaxial cable or an FRC.

The electronic device 500 according to an embodiment may include the first antenna 545, the second antenna 550, the third antenna 555, the first RF front-end circuit 515 connected to the first antenna 545, the second RF front-end circuit 520 connected to the second antenna 550, the third RF front-end circuit 525 connected to the third antenna 555, a transceiver 510 connected to the first RF front-end circuit 515, the second RF front-end circuit 520, and the third RF front-end circuit 525 and configured to perform wireless communication, the multi-channel grip sensor 530 including two or more channels for sensing a change in capacitance of the antenna, wherein, among the channels, the first channel 533 and the second channel 527 are connected to the first antenna 545 and the second antenna 550, respectively, the first RF signal path 560 through which a first RF signal is transmitted between the first RF front-end circuit 515 and the first antenna 545, the second RF signal path 565 through which a second RF signal is transmitted between the second RF front-end circuit 520 and the second antenna 550, the third RF signal path 570 through which a third RF signal is transmitted between the third RF front-end circuit 525 and the third antenna 555, the first grip sensing path 535 connecting the first channel 533 of the multi-channel grip sensor 530 to the first antenna 545, and the second grip sensing path 540 connecting the second channel 527 of the multi-channel grip sensor 530 to the second antenna 550 through the third RF signal path 570.

The third RF signal path 570 may include a coaxial cable or an FRC.

The electronic device 500 may further include the processor 505 configured to control the transceiver 510, and an electrical signal path 580 connecting the multi-channel grip sensor 530 to the processor 505, wherein the electrical signal path 580 may include an FPCB.

The first RF front-end circuit 515, the second RF front-end circuit 520, the third RF front-end circuit 525, and the transceiver 510 may be provided on the main board 504 of the electronic device 500, and the multi-channel grip sensor 530 may be provided on the sub-board 502 of the electronic device 500.

The first antenna 545 and the third antenna 555 may be provided at a location adjacent to the sub-board 502, and the second antenna 550 may be provided at a location adjacent to the main board 504.

The electronic device 500 may further include the first isolation component 573 provided between the first channel 533 of the multi-channel grip sensor 530 and the first antenna 545 on the first grip sensing path 535, the second isolation component 553 provided between the second channel 527 and the third RF signal path 570 on the second grip sensing path 540, and the third isolation component 558 provided between the third RF signal path 570 and the second antenna 550 on the second grip sensing path 540.

According to an electronic device including a multi-channel grip sensor according to various embodiments disclosed in this document and a method of sensing a change in capacitance using the multi-channel grip sensor, it is possible to reduce performance degradation of the multi-channel grip sensor due to a limited mounting space by using an RF signal path used for RF signal transmission in the electronic device for sensing of a change in capacitance using the multi-channel grip sensor.

The electronic device according to various embodiments disclosed herein may be one of various types of electronic devices. The electronic device may include, for example, a portable communication device (e.g., a smartphone), a computer device, a portable multimedia device, a portable medical device, a camera, a wearable device, or a home appliance device. According to an embodiment of the present disclosure, the electronic device is not limited to the devices described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related components. It is to be understood that a singular form of a noun corresponding to an item may include one or more of the item, unless the relevant context clearly indicates otherwise. As used herein, "A or B," "at least one of A and B," "at least one of A or B," "A, B or C," "at least one of A, B and C," and "at least one of A, B, or C," may include any one of the items listed together in the corresponding one of the phrases, or all possible combinations thereof. Terms such as "1st" and "2nd," or "first" and "second" may be used to simply distinguish a corresponding component from other components, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with embodiments of the disclosure, the term "module" may include a unit implemented in hardware, or firmware, and may interchangeably be used with other terms, for example, "logic," "logic block," "part," "circuit," or "circuitry." A module may be a single integral component or a minimum unit or part thereof, adapted to perform one or more functions. For example, according to an embodiment, the module may be implemented in a form of an application-specific integrated circuit (ASIC).

Various embodiments as set forth herein may controlled using software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semipermanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component of the above-described components may include a single entity or multiple entities, and some of the multiple entities may be separately provided in different components. According to various embodiments, one or more of the above-described components or operations may be omitted, or one or more other components or operations may be added. Alternatively or additionally, a plurality of components may be integrated into a single component. In such a case, the integrated component may still perform one or more functions of each of the plurality of components in the same or similar manner as they are performed by a corresponding one of the plurality of components before the integration. According to various embodiments, operations performed by the module, the or another component may be carried out sequentially, in parallel, repeatedly, or heuristically, or one or more of the operations may be executed in a different order or omitted, or one or more other operations may be added.

What is claimed is:

1. An electronic device comprising:
a first antenna;
a second antenna;
a first radio frequency (RF) front-end circuit configured to transmit a first RF signal to the first antenna via a first RF signal path;
a second RF front-end circuit configured to transmit a second RF signal to the second antenna via a second RF signal path;
a transceiver connected to the first RF front-end circuit and the second RF front-end circuit; and
a multi-channel grip sensor comprising a first channel and a second channel, wherein the first channel is connected to the first antenna via a first grip sensing path, wherein the second channel is connected to the second antenna via a second grip sensing path, and wherein the multi-channel grip sensor is configured to sense a change in a first capacitance of the first antenna through the first channel and a change in a second capacitance of the second antenna through the second channel,
wherein the second grip sensing path comprises a portion of the first RF signal path.

2. The electronic device of claim 1, wherein the portion of the first RF signal path comprises a coaxial cable or a flexible RF cable (FRC).

3. The electronic device of claim 2, wherein the electronic device further comprises:
a communication processor configured to control the transceiver; and
a flexible printed circuit board (FPCB) connecting the multi-channel grip sensor to the communication processor.

4. The electronic device of claim 3, further comprising a main board and a sub-board,
wherein the first RF front-end circuit, the second RF front-end circuit, and the transceiver are provided on the main board of the electronic device, and
wherein the multi-channel grip sensor is provided on the sub-board of the electronic device.

5. The electronic device of claim 4, wherein the first antenna is provided adjacent to the sub-board, and
wherein the second antenna is provided adjacent to the main board.

6. The electronic device of claim 5, further comprising:
a first isolation circuit connected between the first channel of the multi-channel grip sensor and the first antenna on the first grip sensing path;
a second isolation circuit connected between the second channel and the first RF signal path on the second grip sensing path; and a third isolation circuit connected between the first RF signal path and the second antenna on the second grip sensing path.

7. The electronic device of claim 6, wherein each of the first isolation circuit, the second isolation circuit, and the third isolation circuit comprises either an inductor of 40 nH or greater or a resistor of 500 ohms or less.

8. The electronic device of claim 7, further comprising:
a first matching circuit on the first RF signal path; and
a second matching circuit on the second RF signal path, wherein the first matching circuit and the second matching circuit are configured to perform impedance matching.

9. The electronic device of claim 8, further comprising:
a third antenna; and
a third RF front-end circuit configured to transmit a third RF signal to the third antenna via a third RF signal path.

10. The electronic device of claim 9, wherein the third RF signal path comprises a coaxial cable or an FRC.

11. The electronic device of claim 1, further comprising:
a first board;
a second board connected to the first board via a flexible printed circuit board and a radio frequency cable; and
a processor provided on the first board,
wherein the first RF front-end circuit is provided on the first board,
wherein the first RF signal path comprises the radio frequency cable,
wherein the second RF front-end circuit is provided on the first board, and
wherein the multi-channel grip sensor is provided on the second board, and is connected to the processor via the flexible printed circuit board.

12. The electronic device of claim 11, further comprising a plurality of matching circuits,
wherein the processor is configured to, based on a change in capacitance of the first antenna or the second antenna, control the plurality of matching circuits to performance impedance matching.

13. The electronic device of claim 11, further comprising a first matching circuit provided on the second board,
wherein the processor is configured to, based on a change in capacitance of the first antenna, control the first matching circuit to performance impedance matching.

14. The electronic device of claim 13, further comprising a second matching circuit provided on the first board,
wherein the processor is configured to, based on a change in capacitance of the second antenna, control the second matching circuit to performance impedance matching.

15. The electronic device of claim 14, wherein the first RF front-end circuit comprises a first duplexer and a first amplifier, and
wherein the second RF front-end circuit comprises a second duplexer and a second amplifier.

16. A method of sensing capacitance using a multi-channel grip sensor in an electronic device configured to perform wireless communication, the method comprising:
sensing, using a first channel of the multi-channel grip sensor connected to a first antenna of the electronic device, a change in a first capacitance of the first antenna;
sensing, using a second channel of the multi-channel grip sensor connected to a second antenna through a first radio frequency (RF) signal path, a change in a second capacitance of the second antenna; and
transmitting an RF signal is from a first RF front-end circuit of the electronic device to the first antenna through the first RF signal path.

17. The method of claim 16, further comprising:
performing impedance matching of the first antenna based on the change in the first capacitance of the first antenna; and
performing impedance matching of the second antenna based on the change in the second capacitance of the second antenna.

* * * * *